(12) United States Patent
Cheshire (10) Patent No.: US 7,711,829 B2
(45) Date of Patent: *May 4, 2010

(54) METHOD AND SYSTEM FOR PREVENTING A TIMEOUT FROM REACHING A NETWORK HOST

(75) Inventor: Stuart David Cheshire, San Jose, CA (US)

(73) Assignee: Apple Inc., Cupertino, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 12/008,162

(22) Filed: Jan. 8, 2008

(65) Prior Publication Data

US 2008/0177882 A1 Jul. 24, 2008

Related U.S. Application Data

(63) Continuation of application No. 11/040,560, filed on Jan. 20, 2005, now Pat. No. 7,321,933, which is a continuation of application No. 09/735,862, filed on Dec. 12, 2000, now Pat. No. 6,862,627.

(51) Int. Cl.
G06F 15/16 (2006.01)
G06F 11/00 (2006.01)

(52) U.S. Cl. .................. 709/227; 709/224; 709/228
(58) Field of Classification Search .............. None
See application file for complete search history.

(56) References Cited

U.S. PATENT DOCUMENTS 6,023,724 A * 2/2000 Bhatia et al. ............... 709/218
6,389,127 B1 * 5/2002 Vardi et al. ............ 379/209.01
6,611,868 B1 8/2003 Arutyunov

OTHER PUBLICATIONS

IBM Technical Disclosure Bulletin, "Separation of file/directory pathname canonicalization from validation", Nov. 1, 1999, p. 1543, issue 427, UK.
Mockapetris, P. "Domain Names—Concepts and Facilities," RFC 1034, Nov. 1987, http://www.rfc-editor.org/rfc/rfc1034.txt.
Mockapetris, P. "Domain Names—Implementation and Specification," RFC 1035, Nov. 1987, http://www.rfc-editor.org/rfc/rfc1035.txt.
Postel, J. "User Datagram Protocol," RFC 768, Aug. 28, 1980, http://www.rfc-editor.org/rfc/rfc768.txt.
Socolofsky, T. "A TCP/IP Tutorial," RFC 1180, Jan. 1991, http://www.rfc-editor.org/rfc/rfc1180.txt.
Simpson, W. "The Point-to-Point Protocol," RFC 1661, http://www.rfc-editor.org/rfc/rfc1661.txt, Jul. 1994.

* cited by examiner

*Primary Examiner*—Ashok B Patel
(74) *Attorney, Agent, or Firm*—Blakely, Sokoloff, Taylor & Zafman LLP (57) ABSTRACT

A method and system for preventing a timeout from reaching a network host when bringing up a down link that is slow to waken. The method generally comprises receiving a request to access an information. If a link along a path to a remote computer containing the information is down, the link is established while concurrently returning a plurality of imposter responses, such as domain names, until the network link is established. Software implementing this method may be stored and executed in any network host. This method is particularly advantageous when waiting for a dial-up telephone connection to a network to be established.

47 Claims, 5 Drawing Sheets

METHOD AND SYSTEM FOR PREVENTING A TIMEOUT FROM REACHING A NETWORK HOST

The present application is a continuation of a U.S. application Ser. No. 11/040,560, filed Jan. 20, 2005, now issued as U.S. Pat. No. 7,321,933, which is a continuation of U.S. patent application Ser. No. 09/735,862, filed Dec. 12, 2000, now issued as U.S. Pat. No. 6,862,627.

FIELD OF THE INVENTION

This invention relates to the field of networked computers. More specifically, in one embodiment the invention relates to a system and method that allows a personal computer user to transparently establish a dial-up network connection without experiencing a timeout or other similar error message. In another embodiment, the invention relates more generally to a system and method that allows a network host to complete a communication with another host without experiencing a timeout or other similar error message while waiting for an intermediary link to be established.

BACKGROUND OF THE INVENTION

The Internet and personal computers have become ubiquitous in modern society. People regularly access to the Internet via their personal computer for any number of purposes. As a consequence of the popularity of computers, many households and small businesses now own and use more than one personal computer. Traditionally, most home and small business computer users have accessed the Internet via a modem plugged in to a telephone line. However, as only one computer can use a standard analog phone line at a time, the multiple computers now present in many homes and small businesses cannot simultaneously connect to an Internet service provider. One solution that allows multiple users to simultaneously access the Internet is via a local area network (LAN). When multiple computers are connected to a LAN, only the LAN need be connected to the Internet for all of the computers on the LAN to be connected to the Internet. A problem with traditional LANs is that computers must be connected by a cable to the LAN cable, and most homes and small businesses do not have wiring that allows for a LAN. To install such wiring may be cost prohibitive. One solution is connecting computers to one another wirelessly.

To allow users to more conveniently access computers, wireless networking products have been introduced. One such product, AirPort™ by Apple Computer, Inc. of Cupertino, Calif., provides wireless communications between multiple computers and a base station to form a LAN, where only the base station is physically connected to a cable that provides access to the Internet. Via the AirPort™ product, access to the Internet may be via DSL, analog phone line, CATV cable modem, or integrated services digital network (ISDN) line. A software base station has also been developed such that only one computer need be physically connected to an Internet access cable, and other computers in the LAN communicate wirelessly with the computer running a software base station program to access the Internet.

While using the Internet, hidden from the user are the various communications protocols that make the Internet function. Various committees and ad hoc groups known as working groups coordinate and control the Internet. The Internet Engineering Task Force (IETF) is the protocol engineering and development arm of the Internet. Working groups under the IETF determine the rules and protocols for the underlying functionality of the Internet and publish them as requests for comment, commonly referred to as RFCs.

Most computers on the Internet, including web sites, are identified by a domain name. Uniform resource locators (URLs) usually contain the IP address or the domain name of the web server where the resource is located. Each domain name is effectively translated into an Internet protocol (IP) address. The format of an IP address is a 32 bit numeric address expressed as four decimal numbers, each separated by a dot commonly referred to as "dotted-decimal notation." Each number must be in the range from zero to 255. For example, 207.105.50.5 is an IP address. It is the IP address that is used by underlying network software when a personal computer communicates over the Internet. When using the Internet, to request that a particular web site be displayed, a name to IP address translation is performed that is transparent to the user. More information about the domain name system and IP addresses can be obtained from the following documents: P. Mockapetris, *Domain Names—Concepts And Facilities*, RFC 1034, November 1987, http://www.rfc-editor.org/rfc/rfc1034.txt; P. Mockapetris, *Domain Names—Implementation And Specification*, RFC 1035, November 1987, http://www.rfc-editor.org/rfc/rfc1035.txt. Information is communicated over the Internet via the User Datagram Protocol connectionless transport protocol running on top of the Internet Protocol (UDP/IP) or via the Transmission Control Protocol running on top of the Internet Protocol (TCP/IP). Many personal computers utilize the point to point protocol (PPP) to communicate with an Internet service provider to obtain a link to the Internet. More information is available from J. Postel, *User Datagram Protocol*, RFC 768, Aug. 28, 1980, http://www.rfc-editor.org/rfc/nfc768.txt; T. Socolofsky, *A TCP/IP Tutorial*, RFC 1180, January 1991 and http://www.rfc-editor.org/rfc/rfc1180.txt; and W. Simpson, editor, *The Point-to-Point Protocol*, RFC 1661, http://www.ietf.org/rfc/rfc1661.txt.

When using application programs and computer systems that transparently establish a dial-up connection to an Internet service provider, when a request is made for a web site, the connection to the Internet service provider must first be established. Such a connection takes time, and the amount of time needed typically exceeds the response time expected by the application program that made the request. In addition, the operating system has a certain default timeout time such that upon expiration of the timeout, a message is sent to the application stating that the information about a requested web site cannot be obtained. This timeout message may also be displayed to the user by the operating system or the application. That is, when the name to IP address translation cannot be performed or is unsuccessful, the user is notified after a certain period of time has elapsed. In a system that provides for easy, transparent connection to the Internet, such error messages being communicated to the user ruins the transparency of the process, thus frustrating the user who expects an effortless connection to the Internet. Such frustration is magnified when a computer user is using a simplified network like the wireless communication and network connection system provided by Apple Computer via the AirPort™ Base Station and the AirPort™ Software Base Station. Whenever establishment of a dial-up connection is required, an amount of time greater than the default timeout allotted for by the operating system is typically exceeded. This timeout results in an error message being displayed to the computer user. Such an error message may cause the user to assume that there is a problem with the wireless connection, or that some other problem requires the user's attention. This inappropriate error message may cause the user to intervene in the startup process, thus defeating the ease of use of the transparent connection technology, and causing the user needless anxiety. A system and method for preventing such dial-up timeouts from reaching a computer system user is needed.

On a more global scale, the Internet is comprised of a series of hosts connected to one another by links of various kinds. To transfer information from one host to another not directly connected to a common link, a series of intermediary hosts must be traversed. These intermediary hosts are typically called routers, proxies, application layer gateways, etc. In some instances, one of the intermediary links may be down and may be slow to resume service. In this situation, the DNS resolver at the originating computer may timeout. A system and method for preventing timeouts caused when bringing up a slow to waken link is needed.

BRIEF SUMMARY OF THE INVENTION

This invention provides a method and system for preventing a timeout from reaching a network host when bringing up a down link that is slow to waken. The method generally comprises receiving a request to access an information. If a link along a path to a remote computer containing the information is down, the link is established while concurrently returning a plurality of imposter responses, such as domain names, until the network link is established. Software implementing this method may be stored and executed in any network host. This method is particularly advantageous when waiting for a dial-up telephone connection to a network to be established.

DETAILED DESCRIPTION OF THE INVENTION

This invention provides a method and system for preventing a timeout from reaching a network host when waiting for a network link to be established. In one embodiment, the method and system may be used when a personal computer connects to the Internet via a wireless connection with a network access device connected to a dial-up telephone line. In another embodiment, the method and system may be used when a personal computer accesses the Internet via a wireless connection to another personal computer that is connected to the Internet. In yet other embodiments, the computers and the network access device may be coupled to one another by cables. In various embodiments, the method of the present invention may be used on any network with regard to any slow to waken link or slow to respond host on the path to a server.

A. Hardware Environment

Figure 1:
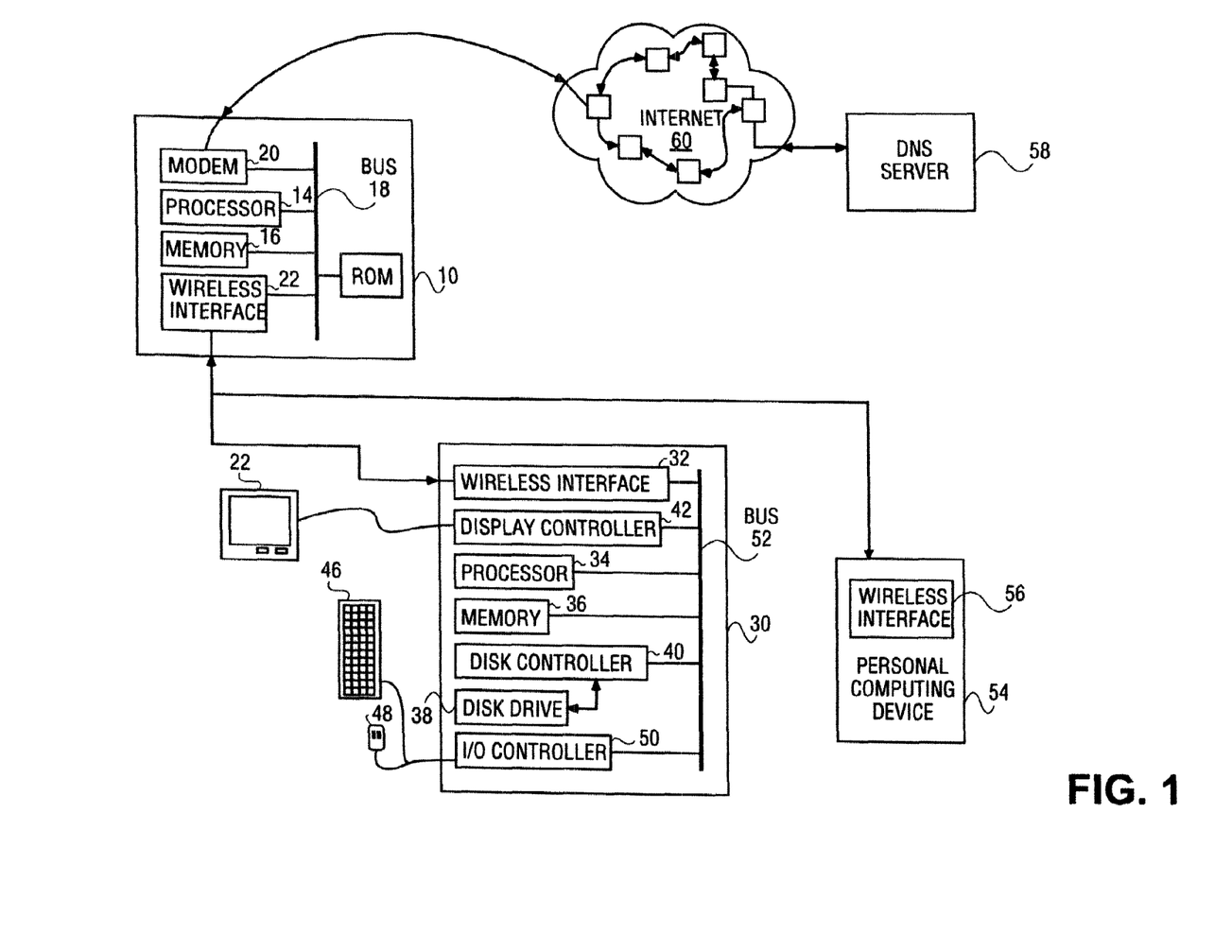
FIG. 1 depicts a computer system, network access device, and network environment of one embodiment of the method and system for preventing a timeout from reaching a network host when connecting to a network.

FIG. 1 depicts a computer system, network access device, and network environment of one embodiment of the method and system for preventing a timeout from reaching a network host when connecting to a network. In one embodiment, the method is implemented in a network access device such the AirPort™ Base Station available from Apple Computer, Inc. of Cupertino, Calif. In one embodiment, network access device 10 includes software stored on a read only memory (ROM) 12. ROM 12 may be any read only memory device known to those skilled in the art including, but not limited to, erasable programmable read only memory (EPROM), electrically erasable programmable read only memory (EEPROM), and flash memory. Network access device 10 includes processor 14 which executes the software stored in ROM 12 using memory 16. Processor 14 may be any computer processor known to those skilled in the art, and memory 16 may be any random access memory (RAM) or other readable and writeable memory device known to those skilled in the art. Processor 14, memory 16 and ROM 12 are coupled via bus 18 to modem 20 and wireless interface 22. Bus 18 may be any bus known to those skilled in the art.

In one embodiment, modem 20 may be an analog modem that allows for access to the Internet 24 via an analog telephone line connection to an Internet service provider. In another embodiment, modem 20 may be a digital modem, a cable modem, or any other kind of modem known to those skilled in the art that allows for access to the Internet via a digital subscriber line (DSL), cable television line, or any other analog or digital line capable of communicating information over a network. In one embodiment, modem 20 supports both 56 Kbps analog transmission pursuant to the International Telecommunication Union (ITU) V.90 (September 1998) standard (more information is available from International Telecommunication Union, U.S. Coordinator and Director, Bureau of International Communications and Information Policy, Department of State, 2201 C. Street, Washington, D.C. 20520). In other embodiments, modem 20 may be replaced with a network adapter that provides 10BASE-T Ethernet communications via integrated services digital network (ISDN), DSL, and cable television, or any other computer communications access device.

Network access device 10 includes wireless interface 22. Wireless interface 22 allows for communication with compatible wireless devices such as personal computer 30. In one embodiment, wireless interface 22 supports communications meeting the I.E.E.E. 802.11 and I.E.E.E. 802.11 HR Direct Sequence Spread Spectrum (DSSS) standards (the "I.E.E.E. 802.11 DSSS standards"). (More information is available from the Institute of Electrical and Electronics Engineers, Inc., at 445 Hoes Lane, PO Box 1331, Piscataway, N.J. 08855-1331.) Network access device 10 communicates via wireless interface 22 with personal computer 30, which includes wireless interface 32 which also supports the I.E.E.E. 802.11 DSSS standards, to provide personal computer 30 access to Internet 60. In another embodiment, network access device 10 may be connected to personal computer 30 by any method known to those skilled in the art, including, but not limited to Ethernet cable, twisted pair cable, fiber optic cable, etc. In this embodiment, wireless interfaces 22 and 32 and replaced with appropriate Ethernet adapter, network adapters, etc.

In one embodiment, personal computer 30 may be any personal computing device that can execute software programs and access the Internet, including, but not limited to, cellular telephones, computer tablets, personal digital assistants, desktop personal computers, portable computers, computer workstations, etc. Personal computer 30 comprises a processor 34 to execute software programs. Processor 34 may be any computer processor known to those skilled in the art. When executing programs, the processor utilizes memory 36. Memory 36 may be any form of random access memory (RAM) known to those skilled in the art. Information is read from and written to disk drive 38 coupled to the personal computer via disk controller 40. Disk drive 38 may be a hard disk drive, a readable and writeable compact disk (CDRW) drive, a floppy disk drive, etc. In addition, disk drive 38 may be any device by which a machine may read from a machine readable medium known to those skilled in the art. Such machine readable media include, but are not limited to, optical and magnetic disks, tapes and similar media; read-only memory (ROM), RAM, and similar memory devices; a flash memory card; etc.

The processor may communicate instructions to display controller 42 to display images on display device 44. Display controller 42 may be any display controller known to those skilled in the art, and display device 44 may be any display monitor known to those skilled in the art, including, but not limited to, a cathode ray tube (CRT) display monitor, or thin film transistor (TFT) display screen. A user accesses personal computer 30 via any computer input device known to those skilled in the art, such as, for example, keyboard 46 and mouse 48 which are coupled to the processor by an input/output (I/O) controller 50. Processor 34, memory 36, disk controller 40, display controller 42, I/O controller 50 and wireless interface 32, are coupled to one another via and communicate with one another over bus 52. Bus 52 may be any bus known to those skilled in the art. Although only one bus is depicted, multiple buses may be used in personal computer 30. In addition, other components and controllers known to those skilled in the art (not depicted) or multiple instances of depicted components and controllers may be included in personal computer 30.

To access information over the Internet, computer 30 includes a wireless interface 32 which allows personal computer 30 to access the Internet 60 via network access device 10 to obtain information on DNS Server 58. DNS Server 58 may be any kind of computer known to those skilled in the art, including, but not limited to, personal computers and servers. In one embodiment, multiple personal computing devices may access the Internet via network access device 10, as can be seen by personal computing device 54 with wireless interface 56 that accesses other Internet devices via network access device 10. In this embodiment, personal computing device 54 may be a personal computer such as personal computer 30 or may be any other kind of personal computing device. Additionally, although only one DNS Server is depicted, multiple DNS Servers (not shown) are accessible via the Internet. In yet other embodiments, the personal computing devices, the personal computer and the network access device may be coupled to one another by cables by methods known to those skilled in the art. More specifically, in these embodiments, personal computing device 54 may be connected to network access device 10 by any method known to those skilled in the art, including, but not limited to, Ethernet cable, twisted pair cable, fiber optic cable, etc. In this embodiment wireless interfaces 22 and 56 are replaced with appropriate devices.

Figure 2:
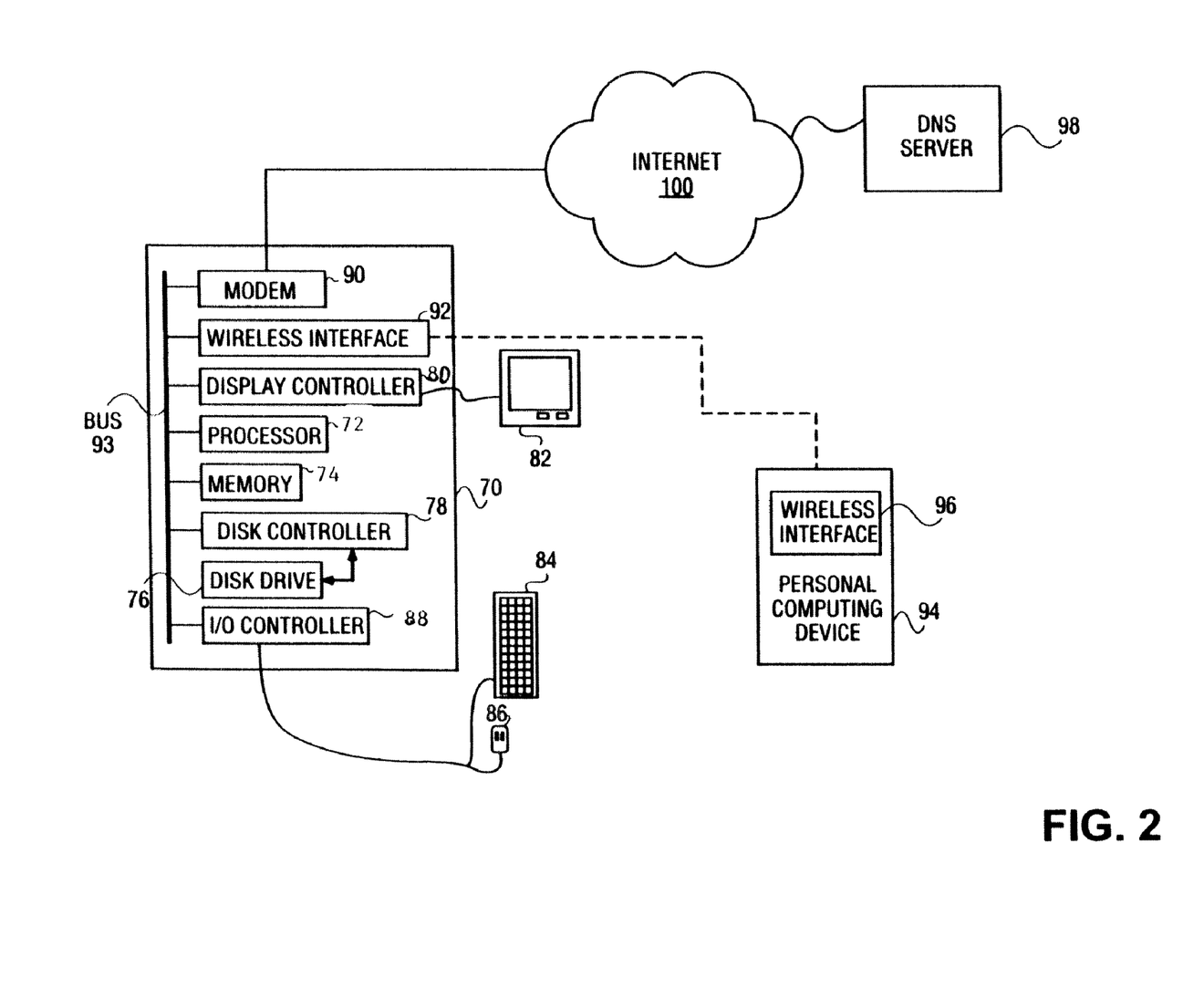
FIG. 2 depicts a computer system and network environment of one embodiment of the method and system for preventing a timeout from reaching a network host when connecting to a network.

FIG. 2 depicts a computer system and network environment of one embodiment of the method and system for preventing a timeout from reaching a network host when connecting to a network. In this embodiment, the method is implemented as software stored in and executed by a personal computer such as personal computer 70. In one embodiment, the method is implemented in a personal computer such as, for example, the Apple Computer G4 running the AirPort™ Software Base Station program, both of which are available from Apple Computer, Inc. of Cupertino, Calif.

Personal computer 70 may be any computing device that can execute software programs and access the Internet. In one embodiment, processor 72 may be any computer processor known to those skilled in the art, and memory 74 may be any random access memory (RAM) or other readable and writeable memory device known to those skilled in the art. Information, including the software program that provides for execution of the method for preventing a timeout from reaching a network user when connecting to a network is read from and written to disk drive 76 which is coupled to the personal computer via disk controller 78. Disk drive 76 may be a hard disk drive, a readable and writeable compact disk (CDRW) drive, a floppy disk drive, etc. In addition, disk drive 76 may be any device by which a machine may read from a machine readable medium known to those skilled in the art. Such devices include, but are not limited to, a flash memory card, a digital audio tape (DAT) reader, etc. The processor may communicate instructions to display controller 80 to display images on display device 82. Display controller 80 may be any display controller known to those skilled in the art, and display device 82 may be any display monitor known to those skilled in the art, including, but not limited to, a CRT display monitor, or TFT display screen. A user accesses personal computer 70 via any computer input device known to those skilled in the art, such as, for example, keyboard 84 and mouse 86 which are coupled to the processor by I/O controller 88.

Personal computer 70 also includes modem 90. In this embodiment, the user of computer 70 may transparently access the Internet whenever a user specifies a web site in a web browser or other application program. Modem 90 may be an analog modem that allows for a dial-up connection to an Internet service provider that provides access to the Internet 100 via an analog telephone line. Processor 72, memory 74, disk controller 78, display controller 80, I/O controller 88, modem 90, and wireless interface 92, are coupled to one another via and communicate with one another over bus 93. Bus 93 may be any bus known to those skilled in the art. Although only one bus is depicted, multiple buses may be used in personal computer 70. In addition, other components and controllers known to those skilled in the art (not depicted) or multiple instances of depicted components and controllers may be included in personal computer 70.

In one embodiment, wireless interface 92 allows for communication with compatible wireless devices such as personal computing device 94. In this embodiment, the user of personal computing device 94 may transparently access the Internet via personal computer 70 whenever a user specifies a web site in a web browser or other application program. In one embodiment, wireless interface 92 supports communications meeting the I.E.E.E. 802.11 DSSS standards. Personal computer 70 communicates via wireless interface 92 with personal computing device 94 which includes wireless interface 96, which also supports the I.E.E.E. 802.11 DSSS standards. Personal computing device may be a personal computer similar to personal computer 70, or may be any other kind of personal computing device.

To access information over the Internet, personal computing device 94 includes a wireless interface 96 which allows personal computing device 94 to access the Internet 100 via personal computer 70 to obtain information on DNS Server 98. DNS Server 98 may be any kind of computer known to those skilled in the art, including, but not limited to, personal computers and servers. Although only one personal computing device and one DNS Server are depicted, multiple personal computing devices may access the Internet via personal computer 70, and multiple DNS Servers are accessible via the Internet. In yet other embodiments, the personal computing devices, the personal computer and the network access device may be coupled to one another by cables by methods known to those skilled in the art.

B. Software Architecture

Figure 3:
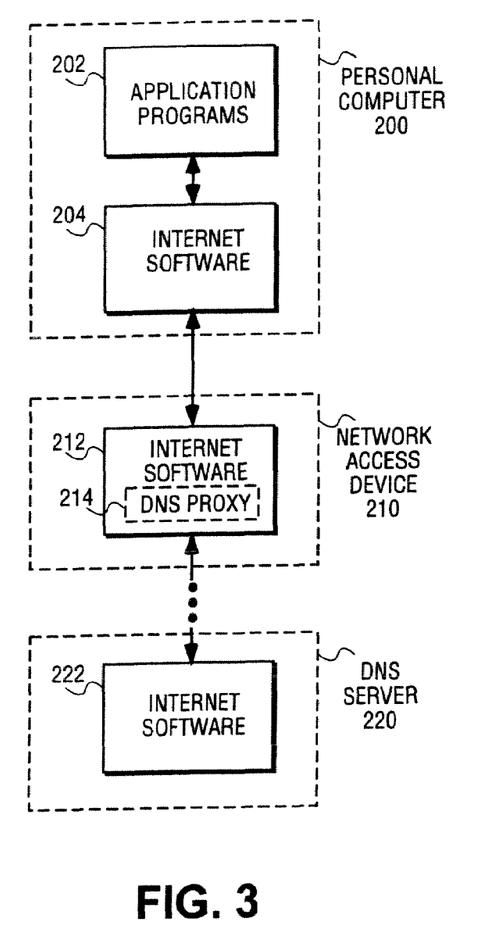
FIG. 3 depicts the software architecture of one embodiment of the system and method for preventing a timeout from reaching a network host when connecting to a network when a dial-up network access device is used.

FIG. 3 depicts the software architecture of one embodiment of the system and method for preventing a timeout from reaching a network host when connecting to a network when a dial-up network access device is used. In one embodiment, personal computer 200 includes a wireless interface to a network access device 210 which is physically connected to a cable which allows for access to the Internet via a dial-up connection with an Internet service provider. In this embodiment, the Internet service provider also is a DNS server and is shown as DNS server 220. Personal computer 200 and network access device 210 are described in detail above with regard to personal computer 30 and network access device 10 of FIG. 1.

Personal computer 200 includes application programs 202 such as web browsers and other applications that may request access to files on computing devices available through the Internet via Internet software 204. Internet software 204 and 212 may be any software that allows for communication over a network such as the Internet, and may be software that provides support for DNS protocol, UDP, PPP, TCP/IP, etc. Internet software 212 also includes software that supports connections to an Internet service provider. In one embodiment, personal computer 200 communicates Internet requests from application programs 202 via Internet software 204 over a wireless interface using supporting software (not shown) to Internet software 212 on network access device 210. In one embodiment, Internet software 212 includes software that implements the method for preventing a timeout from reaching a network user when connecting to a network referred to as DNS Proxy software 214. When network access device 210 receives the request, Internet software 212 attempts to connect to an Internet service provider shown as DNS server 220. If the dial-up connection is not yet established, rather than sending an error message to the application program, DNS proxy 214 returns multiple aliases to Internet software 204 on personal computer 200 until the dial-up link to DNS server 220 is brought up or awakened, or until a maximum time has expired.

After the connection between network access device 210 and DNS server 220 is established, network access device 210 routes Internet DNS requests that originated from application programs 202 on personal computer 200 to DNS server 220 running Internet software 222. Internet software 222 may include software that provides support for DNS protocol, UDP, TCP/IP, etc. Although in the depicted embodiment network access device 210 and personal computer 200 are one hop apart, in other embodiments, they may be many hops apart such that multiple intermediary Internet hosts and corresponding links separate them.

Figure 4:
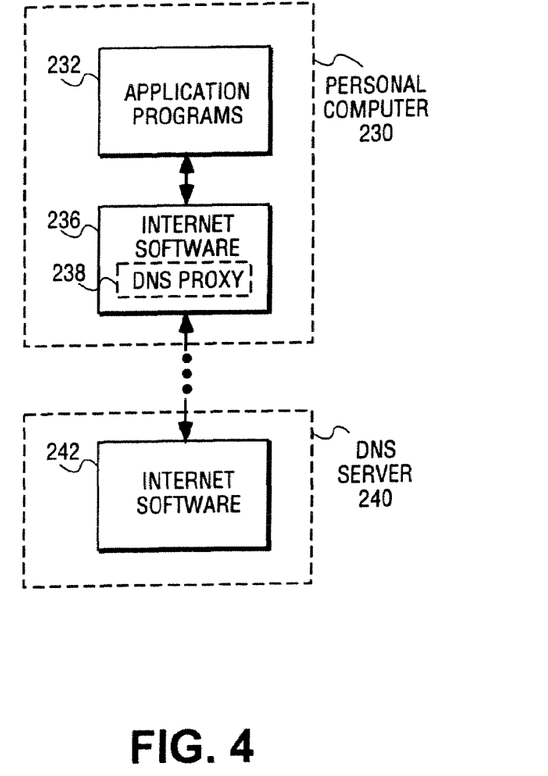
FIG. 4 depicts the software architecture of one embodiment of the system and method for preventing a timeout from reaching a network host when connecting to a network.

FIG. 4 depicts the software architecture of one embodiment of the system and method for preventing a timeout from reaching a network host when connecting to a network. In one embodiment, personal computer 230 includes a modem which is physically connected to a cable which allows for access to the Internet via connection to an Internet service provider. In this embodiment, the Internet service provider is also a DNS server and is shown as DNS server 240. Personal computer 230 is described in detail above with regard to personal computer 70 of FIG. 2.

Personal computer 230 includes application programs 232 such as web browsers and other applications that may access files on the Internet via Internet software 236. Personal computer 230 communicates Internet requests from the application programs 232 through Internet software 236. Internet software 236 routes Internet DNS requests that originated from application programs 232 on personal computer 230 to DNS server 240 running Internet software 242. Internet software 236 and 242 may include software that provides support for DNS protocol, UDP, PPP, TCP/IP, etc. In one embodiment, Internet software 236 may include DNS proxy software 238 that implements the method for preventing a timeout from reaching a network user when connecting to a network.

In another embodiment, personal computer 230 may include software (not shown) and a wireless interface (not shown) that support communications with other personal computing devices such that personal computer 230 routes Internet requests from the other personal computing devices to an Internet host via Internet software 236.

C. A Method of Preventing a Timeout from Reaching a Network User when Connecting to a Network In one embodiment, when a user attempts to access a web server via the Internet by opening a web browser and inputting the desired URL, the Internet software causes a DNS request referred to as an A-Record lookup to be sent to a DNS server to provide the IP address for the specified web site. This is simply a name to address translation. However, in one embodiment, an attempt to send this DNS request is made before the computer on which the web browser is running has established a dial-up connection to an Internet service provider. To successfully send the A-Record request to the DNS server, a connection to the Internet must exist. Moreover, establishing a dial-up connection to an Internet service provider requires more time than is allowed by the DNS resolver. As such, an error message such as a time out or web site not found will be displayed to the user. To circumvent the displaying of an error to the user, the method of the present invention may be used. This method may also be applied when a any network host attempts to raise a slow to wake down link.

Figure 5:
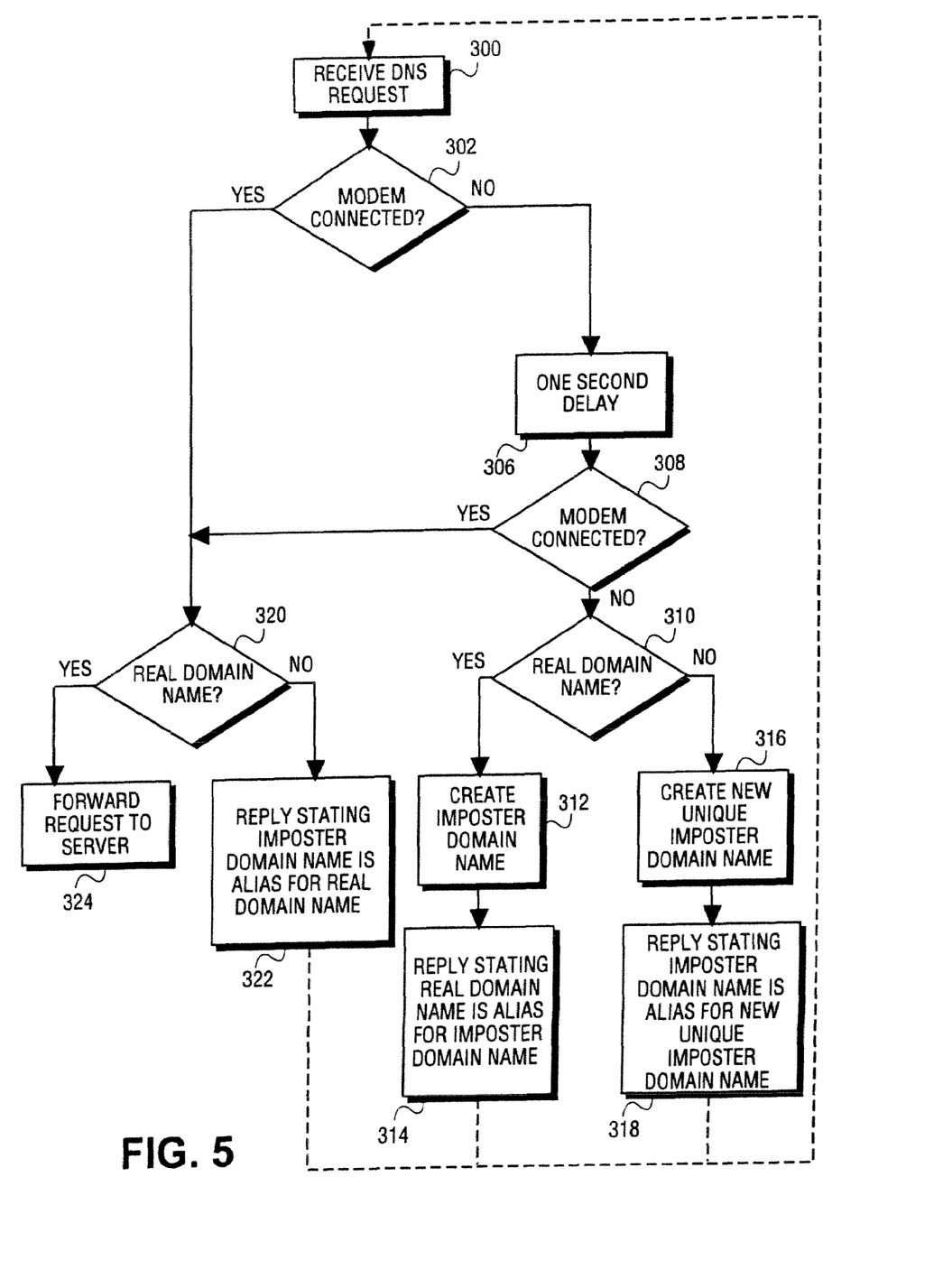
FIG. 5 depicts the flow of actions taken according to one embodiment of the method and system for preventing a timeout from reaching a network host when connecting to a network.

FIG. 5 depicts the flow of actions taken according to one embodiment of the method and system for preventing a timeout from reaching a network host. This method may be implemented as DNS proxy software that may be stored in a ROM in a network access device such as network access device 10 depicted in FIG. 1, or may be included with Internet software stored on a machine readable medium such as a hard disk drive in a personal computing device such as personal computer 70 depicted in FIG. 2. In other embodiments, the DNS proxy software that implements the method of the present invention may be stored on a ROM or any machine readable medium in any network host such as a personal computing device, server, router, gateway, or other similar device.

The method begins with the receipt of a DNS request. Upon receiving a DNS request, as shown in block 300, a check is made to determine whether the modem is connected to the Internet via an Internet service provider, as shown in block 302. If the modem is not connected to the Internet, to avoid an infinite loop packet storm, the method delays or pauses for a short period of time, such as, for example, one second delay, as shown in block 306. This delay or pause may be achieved according to any of a variety of methods.

Another check is then made to determine whether the modem is connected to the Internet, as shown in block 308. If the modem is still not connected to the Internet, the domain name in the DNS request is examined to determine whether the domain name is a real domain name, as shown in block 310. In one embodiment, this determination can be made solely by an examination of the domain name being requested, as described below. If the DNS request is for a real domain name, an imposter domain is created, as shown in block 312. The imposter domain name, in one embodiment, is derived from the real domain name by appending information to the end of the real domain name. A reply to the DNS request is then created and sent stating that the real name is an alias for the imposter domain name, as shown in block 314. In one embodiment, this is achieved by responding that the real domain name's canonical name (CNAME) is the imposter domain name. This will cause the resolver to resend the DNS request for the address of the imposter domain name. In addition, the CNAME packet may specify a very short time-to-live, such as one second or even zero, so that the CNAME alias is cached for only a short, transitory period. In one embodiment, during this process, the modem is attempting to establish a dial-up connection to the Internet.

When the browser sends a DNS request for the imposter domain name, processing of the packet proceeds as in blocks 300-306, as already discussed. If the modem is still not connected to the Internet, as shown in block 308, and the request is for an imposter domain name, as shown in block 310, a new, unique imposter domain name is created, as shown in block 316. In one embodiment, this is achieved by incrementing a number contained in the information that was appended to the real domain name to create the initial imposter domain name. In one embodiment, the information appended to the real domain name to create an imposter domain name includes a number that is incremented each time a new, unique imposter domain name is created. For example, if the original DNS request was for "www.abcdefg.com", the text ".dialing-NN.example.com" is appended to create imposter domain name "www.abcdefg.com.dialing-NN.example.com." The original imposter has NN set to 00 resulting in "www.abcdefg.com.dialing-00.example.com." To create the first new, unique imposter domain name, the original imposter domain name is incremented to "www.abcdefg.com.dialing-01.example.com." The text ".dialing-NN.example.com" is an example of a syntactically correct extension that conforms with applicable Internet protocols, yet can be programmatically distinguished from any possible current or future actual host name, provided that we know the domain "example.com" is not (and will not ever be) used for real host addresses. Any syntactically correct text string may be used in a similar fashion.

After the new, unique imposter domain name is created, as shown in block 316, a reply to the DNS request is then created and sent stating that the imposter domain name is an alias for the new, unique imposter domain name, as shown in block 318. In one embodiment, this is achieved by responding that the imposter domain name's real CNAME is the new, unique imposter domain name. In addition, as above, the CNAME packet may specify a very short time-to-live so that the CNAME alias is cached for only a short, transitory period.

Upon receiving the CNAME packet, the resolver will reformat the DNS request and send it for the new, unique imposter domain name. During this process, the modem continues its efforts to establish a dial-up connection to the Internet service provider. A new DNS request is then received, as shown in block 300, and processing continues as discussed above with regard to blocks 302-318. This cycle of creating new, imposter domain names in response to DNS requests containing imposter domain names continues until a dial-up connection to the Internet service provider is established. This is a recursive iteration. In one embodiment, the total number of iterations may be checked, or a maximum time for establishing a connection may be checked to determine whether there is a real problem establishing a connection to the Internet. If the total number of iterations or a maximum time for establishing a connection are exceeded, an appropriate error message may be returned according to methods known to those skilled in the art.

The Internet software checks for and detects when the modem establishes a connection to the Internet service provider, as shown in blocks 302 or 308. The DNS request is checked to determine whether a real domain name has been requested, as shown in block 320. This is done, in one embodiment, by a simple text examination of the end of the text string that comprises the domain name. If the ".calling-NN.example.com" extension is found, it is readily apparent that the domain name is not a real domain name. If the domain name is not real, a reply is prepared and sent stating that the imposter domain name is an alias for the real domain name, as shown in block 322. In one embodiment, this is a response to the sender of the DNS request that the real domain name's CNAME is the imposter domain name. In response to receiving this request, the sender will then send what amounts to the original DNS request for the real domain name. In one embodiment, the real domain name is derived from the imposter domain name by extracting all text to the left of the ".calling-NN.example.com" extension. The naming scheme and such derivation alleviate any need to store and keep track of the real domain name. When multiple connections are pending, this greatly simplifies processing.

In the event that a connection to the Internet service provider was established before a DNS request is received, the flow of execution will be to receive the DNS request, as shown in block 300, and then check whether the modem is connected, as shown in block 302. If the modem is connected to the Internet service provider, a check is then made to determine whether the domain name is real, as shown in block 320. If the domain name is a real domain name, the DNS request is forwarded to the DNS server via the Internet service provider, as shown in block 324.

D. Applying the Method to Network Links

The Internet is comprised of a series of point to point or multipoint connections or links. When one host wishes to communicate with another host, multiple links must be traversed. If one of the links is down, the communication along the specified path will be unsuccessful. If one of the links on the path between two hosts is down, the communication may continue and appear as uninterrupted to an end user if the requesting host is tricked into waiting while the down link can be awakened or established.

Figure 6:
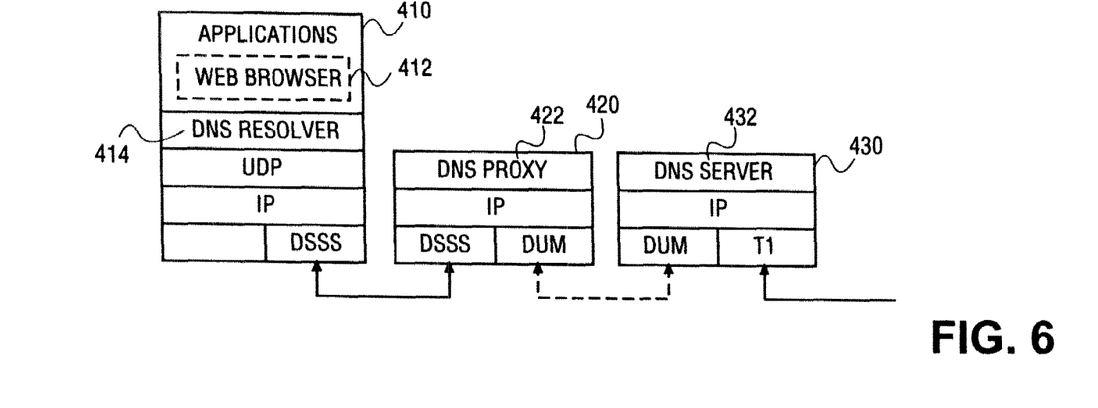
FIG. 6 depicts the network architecture of an embodiment of the system and method for preventing a timeout from reaching a network host.

FIG. 6 depicts the network architecture of an embodiment of the system and method for preventing a timeout from reaching a network host. As discussed above, personal computer 410 may communicate over the Internet via a local base station 420 that establishes a dial-up connection with Internet service provider 430. In one embodiment, personal computer 410 communicates with the base station wirelessly via the I.E.E.E. 802.11 DSSS standards, as discussed in more detail above, and base station 420 may establish a dial-up modem (DUM) connection with Internet service provider 430. Base station 420 implements the method of the present invention in software as described above. This software may be referred to as DNS Proxy 422.

In one embodiment, when a user of personal computer 410 attempts to communicate over the Internet via base station 420, base station 420 must establish a dial-up communication link with Internet service provider 430. More specifically, attempting to access a web page via web browser 412 on personal computer 410 may cause DNS resolver 414 to send a DNS request to DNS server 432 on Internet service provider 430. To prevent a timeout from occurring, DNS Proxy 422 of base station 420 executes the method of the present invention, sending imposter domain name aliases to personal computer 410 until the dial-up connection with the Internet service provider 430 is established, or until the method reaches a predetermined number of iterations or a predefined amount of time has expired. The link shown as a dashed line between base station 420 and Internet service provider 430 is down before a dial-up connection is established. This link is brought up when the dial-up connection is established.

Figure 7:
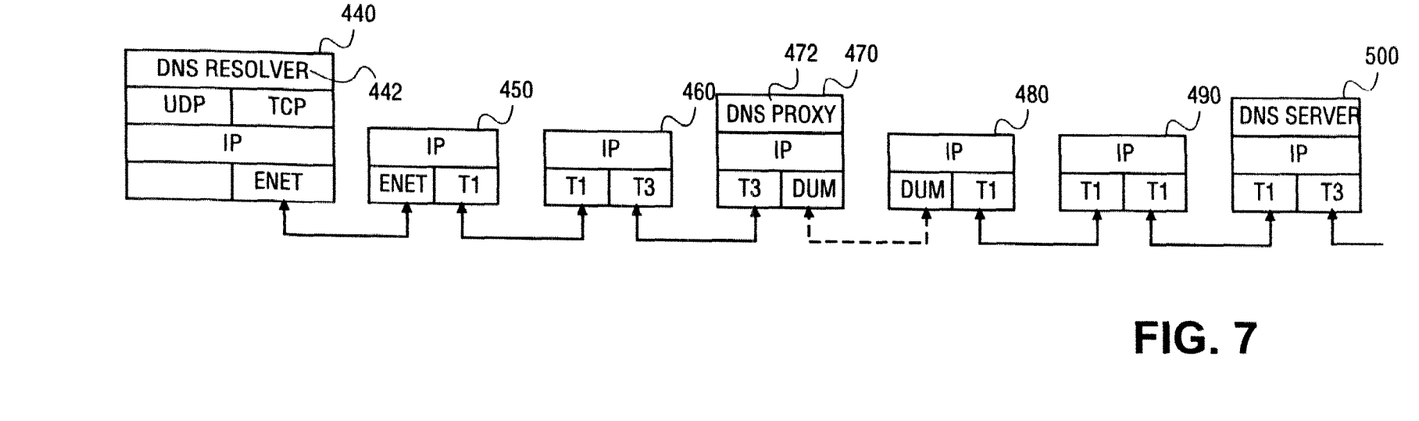
FIG. 7 depicts the network architecture of an embodiment of the system and method for preventing a timeout from reaching a network host.

FIG. 7 depicts the network architecture of an embodiment of the system and method for preventing a timeout from reaching a network host. The present invention is useful when any link on the path between the DNS client and the DNS server goes down. The present invention allows the requester to continue its activities without receiving an error, for example, a message that a connection could not be established. Whenever a network host issues a DNS request of any kind, the request is sent to a DNS Server. Network hosts are depicted as 440, 450, 460, 470, 480, 490, and 500. Host 440 may be any computer, computing device, server, etc. Host 440 may issue a DNS request and may be referred to as the requester. DNS resolver 442 in host 440 may then send a DNS request to DNS server 500. A DNS server is a kind of network host. To get to the DNS server, the DNS request must be communicated from host 440 through hosts 450, 460, 470, 480, and 490 before reaching host 500. Various methods of communication may be used. In this example, ethernet (ENET) is used between hosts 440 and 450 while host 450 communicates with host 460 over a T1 line, host 460 communicates with host 470 over a T3 line, host 480 communicates with host 490 over a T1 line, and host 490 communicates with host 500 over a T1 line. If when the DNS request reaches host 470 and the dial-up modem (DUM) link to DNS server 480 is down, rather than sending an error message of some kind back to requester 440, the method of the present invention implemented as DNS proxy 472 on host 470 returns multiple aliases until the link to DNS server 500 through hosts 470 and 480 is brought up or awakened, or until a maximum time has expired. The down link that is brought up is depicted as a dashed line between hosts 470 and 480. In this way, the method of the present invention may be implemented in any network host connected via a link that may occasionally go down. For example, each of hosts 450, 460, 480 and 490 may, in other embodiments, include DNS proxy software that implements the method of the present invention. In this example, hosts 450 through 490 may be routers or other network communications apparatus. If the down link is fast to awaken (such as, for example, a T1 line), this method is not needed. The DNS proxy of the present invention is useful for dial-up telephone modems and any other situation where there is a slow to waken link, such as a motorized automatic satellite dish that can be called on to track a particular satellite on demand, but takes many seconds to do so.

In various embodiments, the method of the present invention may be used with other Internet protocols. In one such embodiment, for example, if a web page request causes a web browser on a client to send an hyper-text transfer protocol (HTTP) "GET" request to a web server that is behind a down link, an HTTP proxy on the client side of the down link could intercept that "GET" request and return a special temporary web page. The temporary web page may include text that communicates to the user that the requested web server is being accessed, such as, "Please wait, accessing server." This informs the user of the delay in waking or connecting to the requested server. In this embodiment, an HTTP META REFRESH instruction may be sent by the HTTP proxy telling the web browser to wait a predetermined appropriate amount of time, such as, for example, five or ten seconds, before attempting to reload the page. Thus the web browser would keep reloading the temporary web page (like the DNS resolver chasing CNAME references described above regarding a DNS proxy) until the link comes up and the initially requested page eventually loads, or until a maximum number of retries is exceeded or a maximum amount of time has elapsed as set in or determined by the HTTP proxy.

In various embodiments, the method of the present invention may be used on any network with regard to any slow to waken link or slow to respond host on the path to a server, so long as the protocol provides a facility (such as the CNAME and META REFRESH discussed above) that allows a proxy to be created according to the method of the present invention that allows for the resending of imposter responses (such as an imposter domain name or a temporary web page) until a true response is possible, a timeout is reached, or a maximum number of retries has been exceeded.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   receiving a request to access an information according to first data;
   sending one or more imposter responses while waiting for connection to provide the information, wherein the one or more imposter responses have second data to resend the request according to the second data.

2. The method of claim 1 wherein the one or more imposter responses comprise at least one temporary web page.

3. The method of claim 1, wherein the one or more imposter responses comprise at least one hyper-text transfer protocol "meta refresh" instruction.

4. The method of claim 1, wherein the one or more imposter responses are sent until a predetermined time is reached.

5. The method of claim 1, wherein the one or more imposter responses are sent until a predetermined number of retries is exceeded.

6. The method of claim 1, wherein the one or more imposter responses are sent until the information is available.

7. The method of claim 1, wherein the sending the one or more imposter response comprises:
   creating a first domain name; and sending a first instruction stating that a real domain name of the request is alias for the first domain name.

8. The method of claim 1 wherein the sending the one or more imposter response comprises:
   creating a second imposter domain name; and
   sending a second instruction stating that an imposter domain name of the request is alias for the second domain name.

9. The method of claim 1, further comprising sending a third instruction that an imposter domain name of the request is alias for the real domain name.

10. The method of claim 1, further comprising forwarding the request to a server.

11. The method of claim 1 wherein the request is initiated by a remote application program.

12. A method to prevent a timeout comprising:
   receiving a request to access an information on a remote server having a first domain name;
   determining whether a connection to the remote server is established; and
   sending an imposter response having a second domain name to resend the request according to the second domain name if the connection to the remote server is not established.

13. The method of claim 12, wherein the sending the imposter response includes creating the second domain name if the first domain name is a real domain name; and sending a first instruction that the first domain name is alias for the second domain name.

14. The method of claim 12, wherein the sending the imposter response includes creating the second domain name if the first domain name is the imposter domain name; and sending a second instruction that the first domain name is alias for the second domain name.

15. The method of claim 12, further comprising determining whether the first domain name is a real domain name; sending the request to the remote server, if the first domain name is the real name; and sending a third instruction that the first domain name is alias for the real name, if the first domain name is not the real name.

16. A machine-readable storage medium containing instructions, which when executed by a data processing system, cause the data processing system to perform operations, comprising:
   receiving a request to access an information according to first data;
   sending one or more imposter responses while waiting for connection to provide the information, wherein the one or more imposter responses have second data to resend the request according to the second data.

17. The machine-readable storage medium of claim 16 wherein the one or more imposter responses comprise at least one temporary web page.

18. The machine-readable storage medium of claim 16, wherein the one or more imposter responses comprise at least one hyper-text transfer protocol "meta refresh" instruction.

19. The machine-readable storage medium of claim 16, wherein the one or more imposter responses are sent until a predetermined time is reached.

20. The machine-readable storage medium of claim 16, wherein the one or more imposter responses are sent until a predetermined number of retries is exceeded.

21. The machine-readable storage medium of claim 16, wherein the one or more imposter responses are sent until the information is available.

22. The machine-readable storage medium of claim 16, wherein the sending the one or more imposter response comprises:
   creating a first domain name; and
   sending a first instruction stating that a real domain name of the request is alias for the first domain name.

23. The machine-readable storage medium of claim 16 wherein the sending the one or more imposter response comprises:
   creating a second imposter domain name; and
   sending a second instruction stating that an imposter domain name of the request is alias for the second domain name.

24. The machine-readable storage medium of claim 16, further comprising instructions that cause the data processing system to perform operations comprising sending a third instruction that an imposter domain name of the request is alias for the real domain name.

25. The machine-readable storage medium of claim 16, further comprising forwarding the request to a server.

26. The machine-readable storage medium of claim 16 wherein the request is initiated by a remote client.

27. A machine-readable storage medium containing instructions, which when executed by a data processing system, cause the data processing system to perform operations to prevent a timeout, comprising:
   receiving a request to access an information on a remote server having a first domain name;
   determining whether a connection to the remote server is established; and
   sending an imposter response having a second domain name to resend the request according to the second domain name if the connection to the remote server is not established.

28. The machine-readable storage medium of claim 27, wherein the sending the imposter response includes creating the second domain name if the first domain name is a real domain name; and sending a first instruction that the first domain name is alias for the second domain name.

29. The machine-readable storage medium of claim 27, wherein the sending the imposter response includes creating the second domain name if the first domain name is the imposter domain name; and sending a second instruction that the first domain name is alias for the second domain name.

30. The machine-readable storage medium of claim 27, further comprising instructions that cause the data processing system to perform operations comprising determining whether the first domain name is a real domain name; sending the request to the remote server, if the first domain name is the real name; and sending a third instruction that the first domain name is alias for the real name, if the first domain name is not the real name.

31. The method of claim 27, wherein the sending the imposter response includes creating the second domain name if the first domain name is a real domain name; and sending a first instruction that the first domain name is alias for the second domain name.

32. The method of claim 27, wherein the sending the imposter response includes creating the second domain name if the first domain name is the imposter domain name; and sending a second instruction that the first domain name is alias for the second domain name.

33. The method of claim 27, further comprising determining whether the first domain name is a real domain name; sending the request to the remote server, if the first domain name is the real name; and sending a third instruction that the first domain name is alias for the real name, if the first domain name is not the real name.

34. A system comprising:
a processor; and
a memory coupled to the processor, wherein the processor is configured to receive a request to access an information according to first data; and
send one or more imposter responses while waiting for connection to provide the information, wherein the one or more imposter responses have second data to resend the request according to the second data.

35. The system of claim 34 wherein the one or more imposter responses comprise at least one temporary web page.

36. The system of claim 34, wherein the one or more imposter responses comprise at least one hyper-text transfer protocol "meta refresh" instruction.

37. The system of claim 34, wherein the one or more imposter responses are sent until a predetermined time is reached.

38. The system of claim 34, wherein the one or more imposter responses are sent until a predetermined number of retries is exceeded.

39. The system of claim 34, wherein the one or more imposter responses are sent until the information is available.

40. The system of claim 34, wherein the sending the one or more imposter response comprises:
creating a first domain name; and
sending a first instruction stating that a real domain name of the request is alias for the first domain name.

41. The system of claim 34 wherein the sending the one or more imposter response comprises creating a second imposter domain name; and sending a second instruction stating that an imposter domain name of the request is alias for the second domain name.

42. The system of claim 34, wherein the processor is further configured to send a third instruction that an imposter domain name of the request is alias for the real domain name.

43. The system of claim 34, wherein the processor is further configured to forward the request to a server.

44. The system of claim 34 wherein the request is initiated by a remote application program.

45. A system to prevent a timeout comprising:
a processor; and
a memory coupled to the processor, wherein the processor is configured to receive a request to access an information on a remote server having a first domain name; to determine whether a connection to the remote server is established; and to send an imposter response having a second domain name to resend the request according to the second domain name if the connection to the remote server is not established.

46. A system, comprising:
means for receiving a request to access an information according to first data;
means for sending one or more imposter responses while waiting for connection to provide the information, wherein the one or more imposter responses have second data to resend the request according to the second data.

47. A system to prevent a time-out, comprising:
means for receiving a request to access an information on a remote server having a first domain name;
means for determining whether a connection to the remote server is established; and
means for sending an imposter response having a second domain name to resend the request according to the second domain name if the connection to the remote server is not established.

* * * * *

UNITED STATES PATENT AND TRADEMARK OFFICE
CERTIFICATE OF CORRECTION

| | |
|---|---|
| PATENT NO. | : 7,711,829 B2 |
| APPLICATION NO. | : 12/008162 |
| DATED | : May 4, 2010 |
| INVENTOR(S) | : Stuart David Cheshire |

It is certified that error appears in the above-identified patent and that said Letters Patent is hereby corrected as shown below:

In column 8, line 52, after "when" delete "a".

Signed and Sealed this
Eighth Day of November, 2011

David J. Kappos
*Director of the United States Patent and Trademark Office*